United States Patent [19]

Buchholz

[11] Patent Number: 5,383,698

[45] Date of Patent: Jan. 24, 1995

[54] TOOL TRAILER WITH OPEN END

[76] Inventor: William Buchholz, 96 Tinton Rd., Spearfish, S. Dak. 57783

[21] Appl. No.: 107,055

[22] Filed: Aug. 17, 1993

[51] Int. Cl.⁶ ................................................ B60P 3/14
[52] U.S. Cl. ................................. 296/24.1; 296/181
[58] Field of Search .............. 296/22, 24.1, 26, 163, 296/168, 181

[56] References Cited

U.S. PATENT DOCUMENTS

| | | | |
|---|---|---|---|
| 2,811,111 | 10/1957 | Levitz et al. | 296/24.1 X |
| 3,237,959 | 3/1966 | Heyl, Jr. | 296/22 X |
| 3,667,799 | 6/1972 | Shryock | 296/22 X |
| 3,705,743 | 12/1972 | Toomey | 296/24.1 X |
| 4,055,206 | 10/1977 | Griffin | 296/24.1 X |
| 4,133,572 | 1/1979 | Robbins et al. | 296/24.1 X |
| 4,556,247 | 12/1985 | Mahaffey | 296/24.1 X |
| 4,981,318 | 1/1991 | Doane et al. | 296/24.1 |

FOREIGN PATENT DOCUMENTS

| | | | |
|---|---|---|---|
| 121140 | 6/1985 | Japan | 296/24.1 |
| 2171365 | 8/1986 | United Kingdom | 296/22 |

Primary Examiner—Dean J. Kramer

[57] ABSTRACT

A trailer for use in the construction trade. The trailer is fitted out with power saws and the like built in and is particularly adapted to accept long pieces of lumber for sawing. The trailer is distinguished by its open platform and cantilevered roof by which three open sides are provided so that longer pieces of lumber may be ripped.

2 Claims, 3 Drawing Sheets

TOOL TRAILER WITH OPEN END

BACKGROUND AND SUMMARY OF THE INVENTION

It is common in the construction trade when buildings are custom built to move certain types of power tools to the building site. One of the more useful power tools is the table saw. However, a radial arm saw and other tools may also be beneficial.

Customarily, the table saw is set up in the building after it is partially enclosed. Prior to that stage, cutting of lumber by such a device must be done at the contractor's shop. The result is that efficiency is less than would be desirable.

The present invention allows the power tools to be set permanently in an enclosed trailer which is easily portable to the construction site. This type of trailer has not been usable before because of the walls of the enclosed trailer interfered with long sticks of lumber being cut; and an open trailer denied the tools any protection from the weather. The present invention, by use of a cantilevered roof negates the problems previously encountered and makes possible an enclosed portable workshop.

DESCRIPTION

Figure 1:
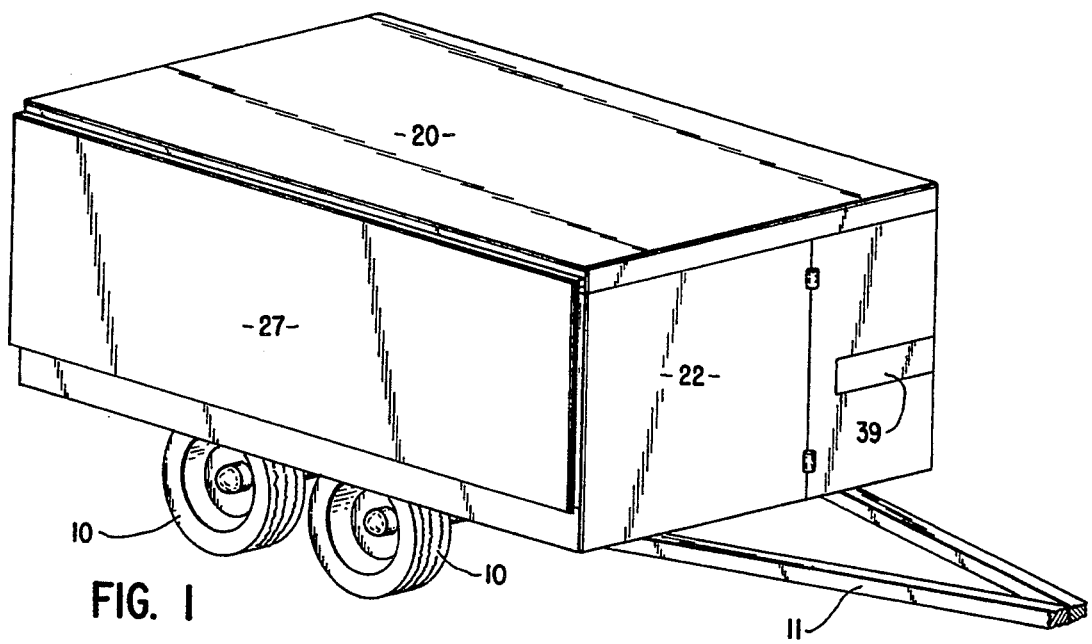
FIG. 1 is a front perspective view of the trailer fully enclosed.

Briefly, this invention proposes a fully enclosed carpenter's shop mounted on a trailer chassis so as to be readily transported. The enclosure is built to allow long pieces of lumber to be easily sawed by power saws contained in the portable shop.

More specifically and referring to the drawings, the device is mounted on a trailer chassis having wheels 10 and a tongue 11. The wheels are journalled on an axle 13 and connected to the frame of the chassis by springs 14. The trailer includes a floor 15 from which low sides 16 extend upwardly in a manner well known in the art. These sides with the floor form the box of the trailer.

The trailer includes a roof 20 supported by walls built onto the floor 15. Particularly there is a central wall 21 and a self supporting wall 23 adapted to support shelves 24. The self supporting wall also provides added stiffness for the central wall 21 and is desirable for firm support of the roof 20. A front wall 22 supports one end of the roof and provides some lateral stability so that the roof does not tip laterally. The self supporting wall 23 also helps in that function. The roof support is completed by a lateral wall 25. This wall 25 is positioned on the floor spaced from the rear of the trailer by about one-fourth to one-third of the length of the floor, thus leaving about that much of the floor 15 exposed. However, the roof is formed as a cantilevered area above that part of the floor so that there is a fairly large platform at the rear of the trailer which is covered by the roof but is clear on three sides.

Figure 2:
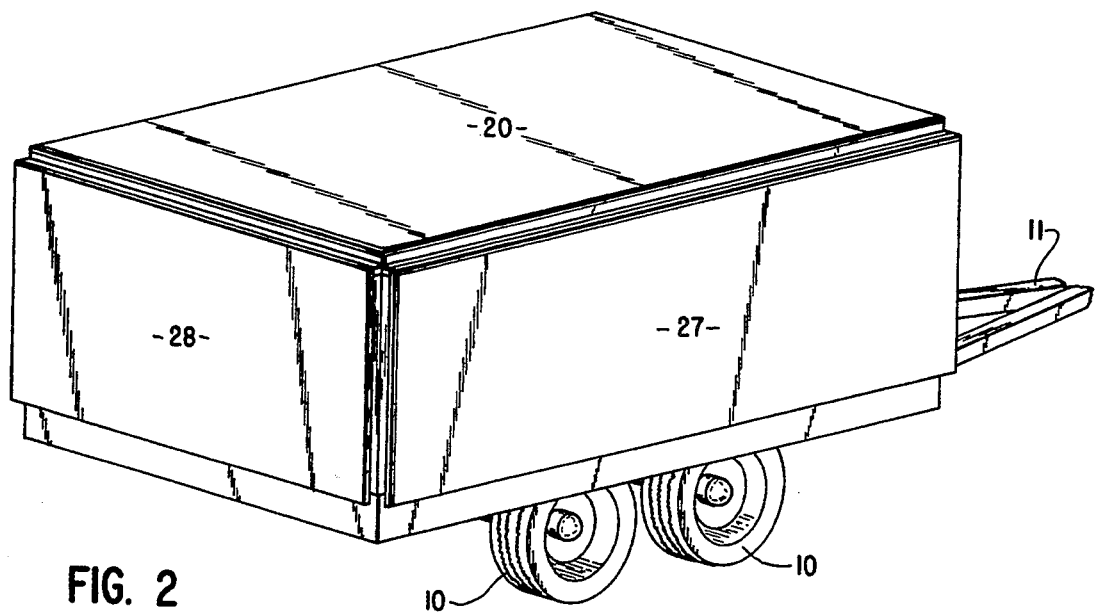
FIG. 2 is a rear perspective view of the trailer as in FIG. 1.
Figure 3:
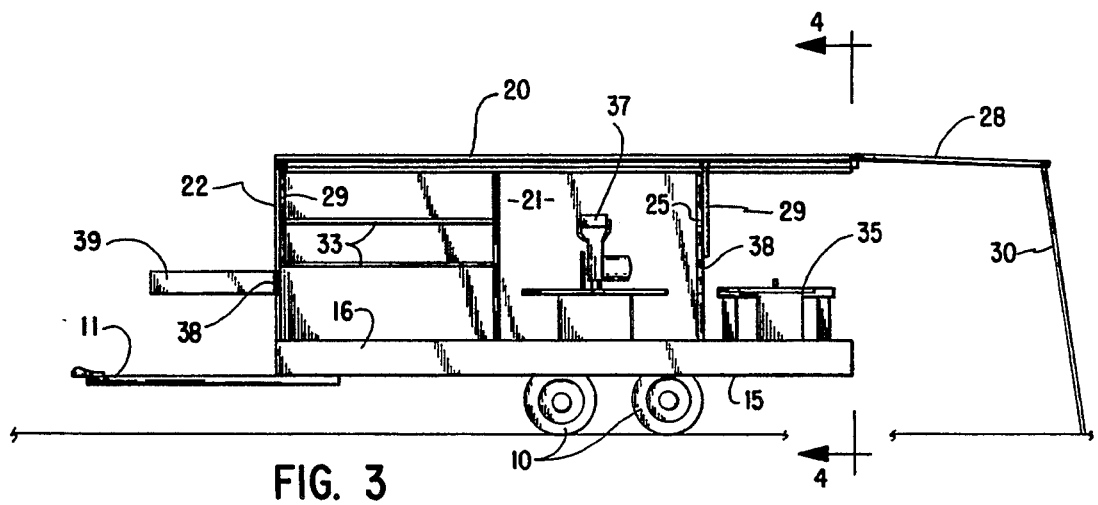
FIG. 3 is a side elevational view of the trailer with the walls completely opened to show some of the contents.

The trailer is enclosed by side closures 27 and an end closure 28 which may be hinged to the roof 25. These covers are closed as shown in FIGS. 1 and 2 while the trailer is transported on the roads. When the trailer is set for use, the side covers 27 are supported by gas springs or by common brackets 29. The rear cover 28 may be supported by a jointed or telescoping post 30 from the ground.

Figure 4:
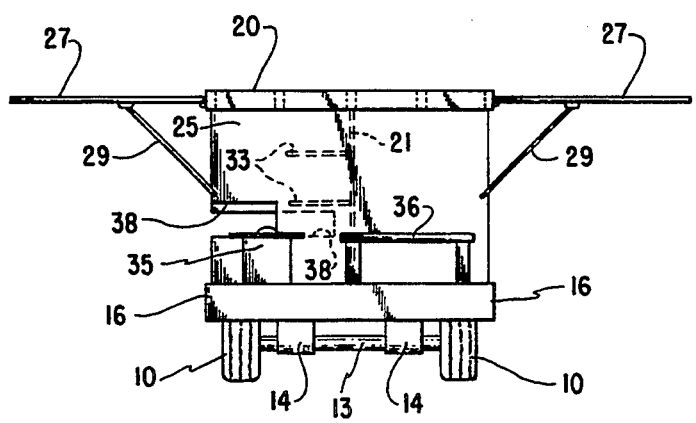
FIG. 4 is a view from line 4—4 of FIG. 3.
Figure 5:
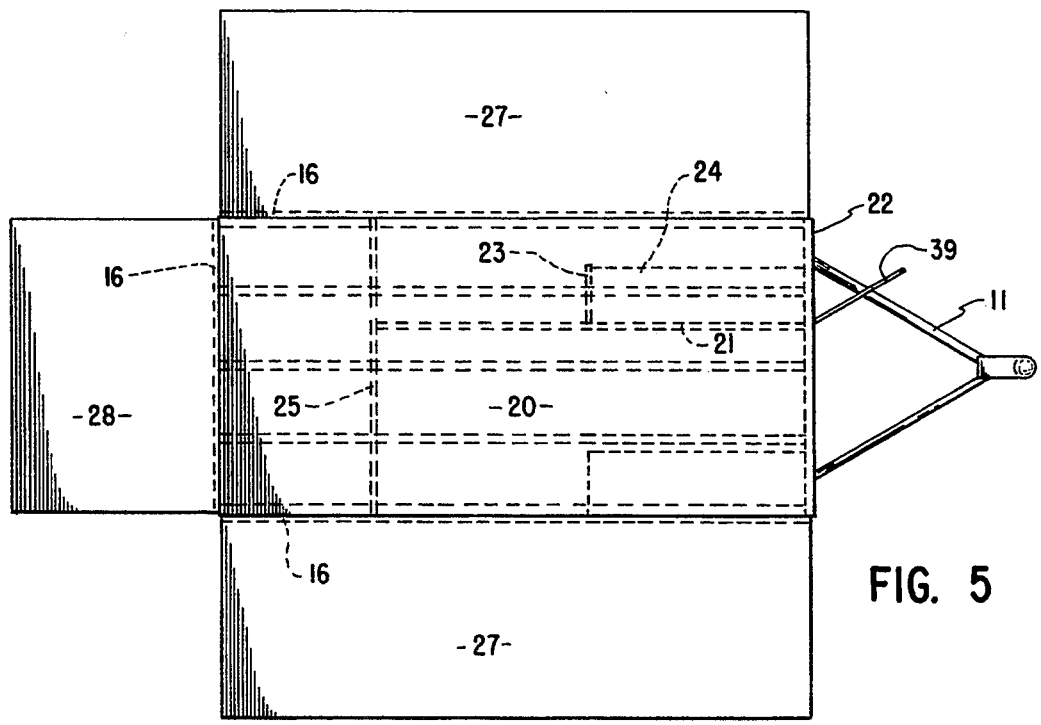
FIG. 5 is a top plan view of the trailer with the doors opened.

In use, a table saw 35 is set on the open rear platform. Because of the openness of that platform allowed by the cantilevered roof, a long board or even a sheet of plywood can readily be positioned to be cut by the saw. A catch table 36 (FIG. 4) may be placed adjacent the saw to receive cut pieces if desired.

In the center of the trailer, a radial arm saw 37 may be placed for purposes of accurately cutting boards to the correct length or with an accurate mitered end. To be most useful, the trailer should be formed with openings 38 in the lateral walls 25 and front wall 22 to allow long pieces of lumber to be readily placed on this latter saw. The opening 38 in the front wall 22 should be closed by a hinged door 39 for protection of the interior of the trailer from dust or precipitation.

Figure 6:
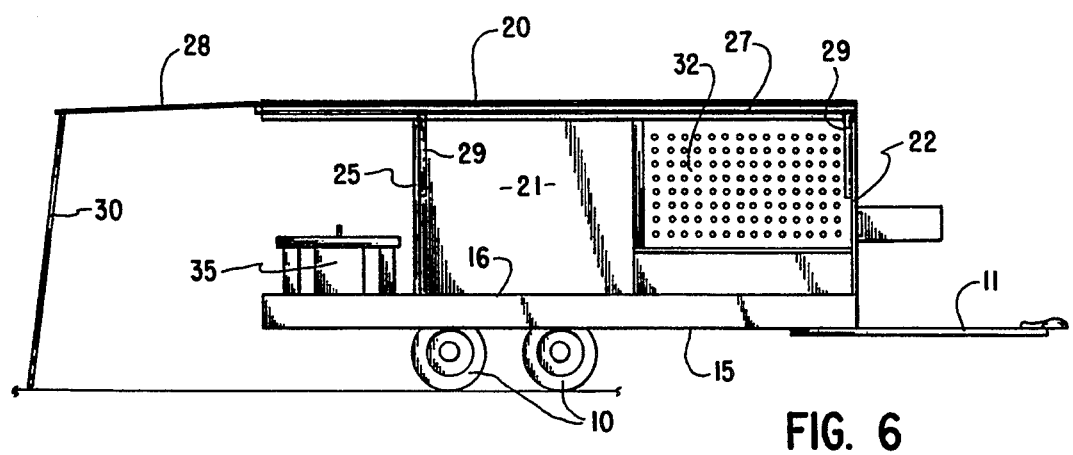
FIG. 6 is an elevational view from the side opposite FIG. 3.

The front chambers of the trailer, and the part opposite the radial arm saw 37 may be adapted for use for storing other tools or small items of material. For example, a peg board panel 32 may be placed on one side of the center wall 21 as shown in FIG. 6. Shelves 33 may be built on the side of that wall opposite the peg board panel 32. Other uses for the other walls, particularly those in empty spaces will occur to any user or others who are engaged in on-site construction.

I claim as my invention:

1. A mobile shop comprising a box having a floor, a front end, lateral sides and rear end, said box being mounted on a trailer chassis, a vertical front wall at said front end of said box, a vertical longitudinal wall dividing said box longitudinally, and a vertical lateral wall spaced at least one-fourth of the length of said box from said rear end, roof means extending over all of said box, said roof means being supported by said walls, said roof means over the rear of said box being a cantilevered surface whereby said lateral wall combines with said floor and said roof means to define a covered platform at the rear of said box, closure means for said shop comprising side covers hinged to said roof means along said lateral sides and a rear cover hinged to said roof means at the rear of said cantilevered surface to combine with said side covers and said front walls to completely enclose said shop for transportation; said front wall, said longitudinal wall and said lateral wall combining to define at least one side compartment, a radial arm saw disposed in said side compartment, said front wall and said lateral wall being formed with openings to allow pieces of lumber of length longer than space between said walls to extend through said openings when in place on said radial arm saw.

2. The mobile shop of claim 1 in which a door is adapted to close said opening in said front wall.

* * * * *